3,363,977
METHOD OF PREPARING SODIUM SULFATE AND HYDROGEN CHLORIDE
Alexander Redniss, 160 W. 77th St.,
New York, N.Y. 10024
No Drawing. Filed Oct. 16, 1963, Ser. No. 316,546
1 Claim. (Cl. 23—121)

ABSTRACT OF THE DISCLOSURE

Two-step process for producing sodium sulfate and hydrogen chloride comprising in a first stage contacting sodium chloride and sulfuric acid at a temperature less than 150° C. to form hydrogen chloride and a mixture of sodium chloride and sodium acid sulfate and contacting in a second zone the mixture of sodium chloride and sodium acid sulfate with molten sodium sulfate in a vertical reactor at a temperature of about 884 to 1000° C. to form additional hydrogen chloride and sodium sulfate.

---

This invention relates to an improved process for the production of high purity gaseous HCl and an alkali sulfate such as sodium sulfate or potassium sulfate.

The manufacture of sodium sulfate and hydrogen chloride by the reaction of sulfuric acid and NaCl is well known and widely accomplished by roasting a mixture of these two substances in a molar ratio of about 1:2 in various types of furnaces which may be provided with agitating means such as rotating parts, movable arms, hammers, traveling shafts or similar mechanical devices. Such prior methods are subject to a number of disadvantages. Complete conversion to alkali sulfate in these roasting furnaces, the hearths of which are commonly made of refractory heated with flue gases, requires an extended, overly long reaction time. Thermal efficiency is low, and maintenance and replacement costs of equipment are high due to breakage, wear and corrosion. Plant shut-downs for repairs are frequent. The HCl evolved is diluted or contaminated with flue gas and/or sulfuric acid vaporized by the uneven heating conditions.

It is an object of this invention to provide a method of producing sodium sulfate and HCl which will not be subject to one or more of the above disadvantages. Another object of the invention is the provision of an improved process for producing high purity HCl and sodium sulfate from NaCl and sodium acid sulfate. A further object of the invention is the provision of an improved process for producing high purity HCl and sodium sulfate from NaCl and sulfuric acid. Other objects and advantages will appear as the description proceeds.

The attainment of the above objects is made possible by my inventive process comprising adding an intimate mixture of about equimolar amounts of NaCl and sodium acid sulfate to a body of molten sodium sulfate, said mixture having been preferably prepared by reacting NaCl with sulfuric acid in a molar ratio of about 2:1 at a temperature of less than about 150° C. It has been found that the process of this invention enables the elimination of most or all of the disadvantages attributable to prior methods referred to above. Costs of equipment and of maintenance thereof are greatly reduced. Completion of the reaction is achieved in but a fraction of the previously required time. Heating costs are minimized due to increased thermal efficiency and the lower reaction time. The HCl evolved is relatively pure, uncontaminated by flue gases and/or vaporized sulfuric acid. The high rate of reaction enables the production of an equivalent amount of product with smaller pieces of equipment. Corrosion problems are likewise minimized.

In carrying out the process of my invention, a feed mixture of about equimolar amounts of NaCl and sodium acid sulfate is added to a body of molten sodium sulfate in any suitable reaction chamber provided with heating means to maintain the sodium sulfate in molten form and preferably at a temperature of about 900 to 1000° C. Said feed mixture may be in fluid or solid form, and at a temperature ranging from room temperature up to about 300° C., with the NaCl and sodium acid sulfate in intimate admixture as achieved by chemical or mechanical means. Thus, the feed may be an intimate physical mixture of NaCl and sodium acid sulfate or nitre cake in finely ground form, or it may be an intimate mixture or mixed crystalline product of the first stage reaction between NaCl and sulfuric acid in a molar ratio of about 2:1 at a temperature of about 80 to 150° C. to produce NaCl, sodium acid sulfate and HCl as more fully described below. The feed mixture may contain a slight excess of the order of about 0.001 to 0.05 mole of NaCl, and is preferrably introduced into the molten sodium sulfate while in solid form at a temperature of less than about 150° C., as for example from room temperature or about 80 to 150° C.

The reaction chamber containing the molten sodium sulfate should of course be gas-tight and the feed mixture may be added below the surface of the body of molten sodium sulfate or, more preferably, dropped onto the surface of said body from the free space above. Upon contact with the molten body of sodium sulfate, the feed mixture is rapidly heated up to and above the melting point of the sodium acid sulfate therein, namely ca. 300° C., whereat the fused sodium acid sulfate surrounds and/or dissolves the particles of NaCl. Reaction between the NaCl and the sodium acid sulfate begins immediately and is substantially completed as they are heated further in the molten bath through about 500° C. At 884° C. or the melting point of sodium sulfate, or up to 900 to 1000° C., the reaction is complete, the entire duration being thus reduced to about 5 minutes or so. The rate and efficiency of the reaction for complete conversion is further enhanced by the automatic agitation of the molten bath caused by thermal convection currents and the bubbling of the evolved HCl to the surface. The process is also peculiarly adapted for continuous operation, by continuously adding feed mixture to the molten body of sodium sulfate, continuously withdrawing the evolved HCl from above the surface of said body, and continuously withdrawing sodium sulfate from said body at a rate approximating its rate of production from the reaction of the NaCl and the sodium acid sulfate, which latter is simply accomplished for example by keeping the surface of the hot melt at the same level.

For the attainment of maximum economy, thermal efficiency, controllability, rate of reaction, and purity of reaction products, and of minimum corrosion, equipment size, and equipment shutdown, it is preferred to employ a vertical reaction chamber or furnace (i.e. wherein the depth of the body of molten sodium sulfate is greater than its width, diameter or other average horizontal dimension, with free space above the surface of said body for collection of the evolved HCl), preferably provided with electrical heating means for maintaining the body of sodium sulfate above its melting point of about 884° C. and preferably at 900 to 1000° C. Said heating means may be of any suitable type, direct or indirect, single or three phase arc, resistance, inductance, radiation, etc. The chamber should be lined with refractory, preferably in multiple thicknesses, one or more of which may be insulating brick and/or foamed silica, to minimize heat losses, and provided with an opening at the bottom for withdrawal of molten sodium sulfate and with trapped openings into the free space at the top for insertion of the feed mixture and withdrawal of the HCl. Location of heating means at the bottom of the chamber ensures maintenance and withdrawal of the sodium sulfate from the bottom in molten condition and at the same time ensures completion of the reaction and enhances the rate of reaction by providing automatic agitation through thermal convection currents thus caused in the body of molten sodium sulfate. A suitably modified version of the known carbide furnace, with underflow, may be employed.

Use of such a vertical type reactor, providing as it does continual increments of heat to the feed mixture as it falls in successive molten layers towards the bottom, enables more rapid completion of the desired reaction whereby the sodium sulfate withdrawn at the bottom contains little or no unreacted sodium acid sulfate and very small amounts of NaCl which may be eliminated if desired.

In accordance with a preferred embodiment of my invention, the above-described feed mixture is a solid, intimate, molecular mixture of NaCl and sodium acid sulfate as produced by reaction of NaCl with sulfuric acid in a molar ratio of amout 2:1 and preferably at a temperature of less than about 150° C. to minimize contamination of the evolved HCl with vaporized sulfuric acid. For this reaction, 98–100% sulfuric acid is preferred, oleum tending to contaminate the evolved HCl with $SO_3$ and lower concentrations of acid providing the evolved HCl with increased amounts of moisture, which latter is of course substantially unobjectionable if the HCl is subsequently absorbed in water. The NaCl for this reaction should also be substantially moisture-free and finely ground, and may be used in a slight molar excess of about 0.01 to 0.05 to ensure complete reaction of the acid. This reaction may be carried out in any suitable apparatus, provided if desired with agitating and/or grinding means, in batch or continuous manner. The NaCl and acid are intimately mixed at room temperature and the mixture heated to 80 or 110 to 150° C. to initiate the reaction, or the NaCl is first mixed with heated (e.g. 80 to 120° C.) acid to expedite the reaction which is slightly exothermic and may in fact thereby evolve partial reaction of NaCl with sodium acid sulfate. It will be understood that the presence of some sodium sulfate thus produced in the feed mixture for the above described reaction chamber (preferably vertical) does not depart from and falls within the scope of the present invention. Initial heat for the reaction between the NaCl and acid may of course be provided by direct or indirect heat exchange with the hot gaseous HCl evolved from the reaction between NaCl and sodium acid sulfate, and/or with the hot sodium sulfate product of said reaction.

To provide a continuous process, it is preferred to carry out the reaction between the NaCl and the acid in a heated enclosed conveyor in which the distance between the feed and exit ends and the rate of advance of the reactants are adjusted and correlated to permit ejection at the exit end of the desired solid intimate molecular mixture of NaCl and sodium acid sulfate directly into the top of the reaction chamber containing the molten sodium sulfate. The conveyor may advance the reactants by screw, paddles, gravity or the like or any combination of such advancing means, and may be directly heated by the hot HCl from the subsequent reaction or indirectly heated by the hot HCl or any other suitable means, e.g. electrically, steam, hot oil or other heat exchange medium, etc. Such a conveyor, or any other reactor in which the NaCl is reacted with sulfuric acid, must of course provide for means to collect and withdraw the HCl evolved.

The following example is only illustrative of my invention and is not to be regarded as limitative. All parts and proportions referred to herein and in the appended claim are by weight unless otherwise indicated.

*Example*

Into the feed end of a jacketed screw conveyor is slowly and continuously fed finely ground, moisture-free NaCl and 100% sulfuric acid in a ratio of about 2.05 moles: 1.0 mole. The conveyor is about 20 feet long, and hot oil at about 150° C. is circulated in the jacket countercurrent from exit end to feed end. The screw is rotated at such a rate as to permit completion of the reaction prior to ejection at the exit end of a solid initimate molecular mixture of NaCl and sodium acid sulfate at a temperature of about 140–150° C. The HCl evolved is withdrawn at the feed end of the conveyor.

The hot mixture of NaCl and sodium acid sulfate is fed directly into the top of a vertical insulated cylindrical furnace electrically heated by three phase arc with electrodes extending from the top head down into the body of molten sodium sulfate. The furnace is about 6 feet high and 3 feet in diameter and is provided at the top with trapped openings for the feed mixture and for the evolved HCl, and at the bottom with a valved opening for withdrawing molten sodium sulfate. The surface of the body of molten sodium sulfate is about 3.5 to 4.0 feet from the bottom, and molten sodium sulfate is withdrawn at the bottom at such a rate as to maintain the surface at the same level. The reaction begins as the feed mixture falls to the surface of the hot melt and is completed in about 5 minutes. The HCl bubbles to the surface, is withdrawn at the top, combined with the HCl from the conveyor, and used for making muriatic acid, for sale as a gas, or for any other desired purpose, if desired after further purification. The withdrawn sodium sulfate is cooled and particulated, i.e. broken into any desired size and shape of particle such as slabs, flakes, granules, etc. Conveniently, this is done by feeding the molten sodium sulfate directly to a cooled flaker drum from which it is continuously removed by doctor blade as a sheet of solid material about 1–2 mm. thick. The heat absorbed by the cooling oil in the drum may be used to supply all the heat needed for the primary reaction between the NaCl and $H_2SO_4$. The sheet of solid material thus removed is dropped into a cooled screw conveyor and broken up into small flakes as desired.

This invention has been disclosed with respect to certain preferred embodiments, and various modifications and variations thereof will become obvious to persons skilled in the art. Thus, although the invention has been described with respect to the production of HCl and sodium sulfate, it will be obvious that my process is equally operative for producing HCl and potassium sulfate by substituting KCl for NaCl and potassium acid sulfate for sodium acid sulfate and making suitable adjustments in temperature and the like. For example, instead of molten sodium sulfate at about 884 to 1000° C., molten potassium sulfate at about 1000 to 1100° C. would be used. It will be understood that this and other modifications and variations referred to above are to be included within the spirit and purview of this invention and application and the scope of the appended claim.

I claim:

1. A method for producing gaseous HCl and sodium sulfate comprising reacting in a first zone NaCl with sulfuric acid in a molar ratio of about 2:1 at a temperature of less than about 150° C., recovering the evolved HCl, and in a second zone continuously dropping the resulting solid intimate mixture of about equimolar amounts of NaCl and sodium acid sulfate onto the surface of a body of molten sodium sulfate having a temperature of about 884 to 1000° C. in a vertical reaction chamber provided with heating means at the bottom thereof, continuously removing the evolved HCl from above the surface of said body, continuously removing molten sodium sulfate from the bottom of said chamber at a rate approximating its rate of production, and cooling the recovered sodium sulfate, the depth of said body exceeding its average horizontal dimension.

References Cited

UNITED STATES PATENTS 1,868,946  9/1932  Low _____ 23—121 X

FOREIGN PATENTS 147  1875  Great Britain.
134,214  3/1920  Great Britain.

EARL C. THOMAS, *Primary Examiner.*
OSCAR R. VERTIZ, *Examiner.*